US010644535B2

(12) United States Patent
Buhay

(10) Patent No.: US 10,644,535 B2
(45) Date of Patent: May 5, 2020

(54) BACKUP POWER DISTRIBUTION ASSEMBLY

(71) Applicant: William Buhay, Connaught (CA)

(72) Inventor: William Buhay, Connaught (CA)

( * ) Notice: Subject to any disclaimer, the term of this patent is extended or adjusted under 35 U.S.C. 154(b) by 174 days.

(21) Appl. No.: 15/849,171

(22) Filed: Dec. 20, 2017

(65) Prior Publication Data

US 2019/0190310 A1 Jun. 20, 2019

(51) Int. Cl.
*H02J 3/00* (2006.01)
*H02J 9/04* (2006.01)
*H01R 9/24* (2006.01)
*H01R 24/78* (2011.01)

(52) U.S. Cl.
CPC .............. *H02J 9/04* (2013.01); *H01R 9/2491* (2013.01); *H01R 24/78* (2013.01); *H02J 2310/14* (2020.01)

(58) Field of Classification Search
CPC ...... H02J 9/04; H02J 2003/143; H01R 9/2491
See application file for complete search history.

(56) References Cited

U.S. PATENT DOCUMENTS

| D429,688 S | 8/2000 | Russo |
| 6,169,340 B1 | 1/2001 | Jones |
| 6,227,890 B1 | 5/2001 | Roper, Jr. et al. |
| 6,674,031 B1 | 1/2004 | Flegel |
| 7,015,404 B2 | 3/2006 | Sodemann et al. |
| 7,909,642 B1 | 3/2011 | Czaenecki et al. |
| D662,896 S | 7/2012 | Czarnecki |
| 9,419,417 B1 | 8/2016 | Taxter |
| 2006/0158037 A1* | 7/2006 | Danley ............ H02J 3/32 307/64 |
| 2010/0019575 A1* | 1/2010 | Verges ............ H02J 3/14 307/38 |
| 2010/0145542 A1* | 6/2010 | Chapel ............ H02J 13/0082 700/295 |
| 2014/0116870 A1* | 5/2014 | Kamen ............ E04H 1/1205 202/83 |
| 2014/0266433 A1* | 9/2014 | Nobbe ............ H03F 1/30 330/151 |
| 2015/0021087 A1 | 1/2015 | Ehrgott |
| 2015/0236704 A1* | 8/2015 | Alfermann ............ G05B 15/02 700/287 |
| 2018/0124714 A1* | 5/2018 | Zhang ............ H04B 1/00 |
| 2018/0159283 A1* | 6/2018 | Garcia ............ H02G 3/18 |

\* cited by examiner

*Primary Examiner* — Alfonso Perez Borroto
*Assistant Examiner* — Esayas G Yeshaw

(57) ABSTRACT

A backup power distribution assembly for operationally coupling interior appliances to an exterior generator includes a junction box that is configured to couple to an exterior surface of a structure, such as a house. A plurality of ports is coupled to and is positioned in the junction box. Each of the plurality of ports is configured to selectively couple to a backup generator. A plurality of outlets is configured to couple to an interior surface of the structure. Each of the plurality of outlets is operationally coupled to a respective port. Each outlet is configured to couple selectively and operationally to a respective appliance, such as a refrigerator, a furnace, a television, and a light. The respective appliance is selectively coupled to the respective generator to power the respective appliance in event of a power outage.

7 Claims, 4 Drawing Sheets

BACKUP POWER DISTRIBUTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including information disclosed under 37 CFR 1.97 and 1.98.

The disclosure and prior art relates to distribution assemblies and more particularly pertains to a new distribution assembly for operationally coupling interior appliances to an exterior generator.

BRIEF SUMMARY OF THE INVENTION

An embodiment of the disclosure meets the needs presented above by generally comprising a junction box that is configured to couple to an exterior surface of a structure, such as a house. A plurality of ports is coupled to and is positioned in the junction box. Each of the plurality of ports is configured to selectively couple to a backup generator. A plurality of outlets is configured to couple to an interior surface of the structure. Each of the plurality of outlets is operationally coupled to a respective port. Each outlet is configured to couple selectively and operationally to a respective appliance, such as a refrigerator, a furnace, a television, and a light. The respective appliance is selectively coupled to the respective generator to power the respective appliance in event of a power outage.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
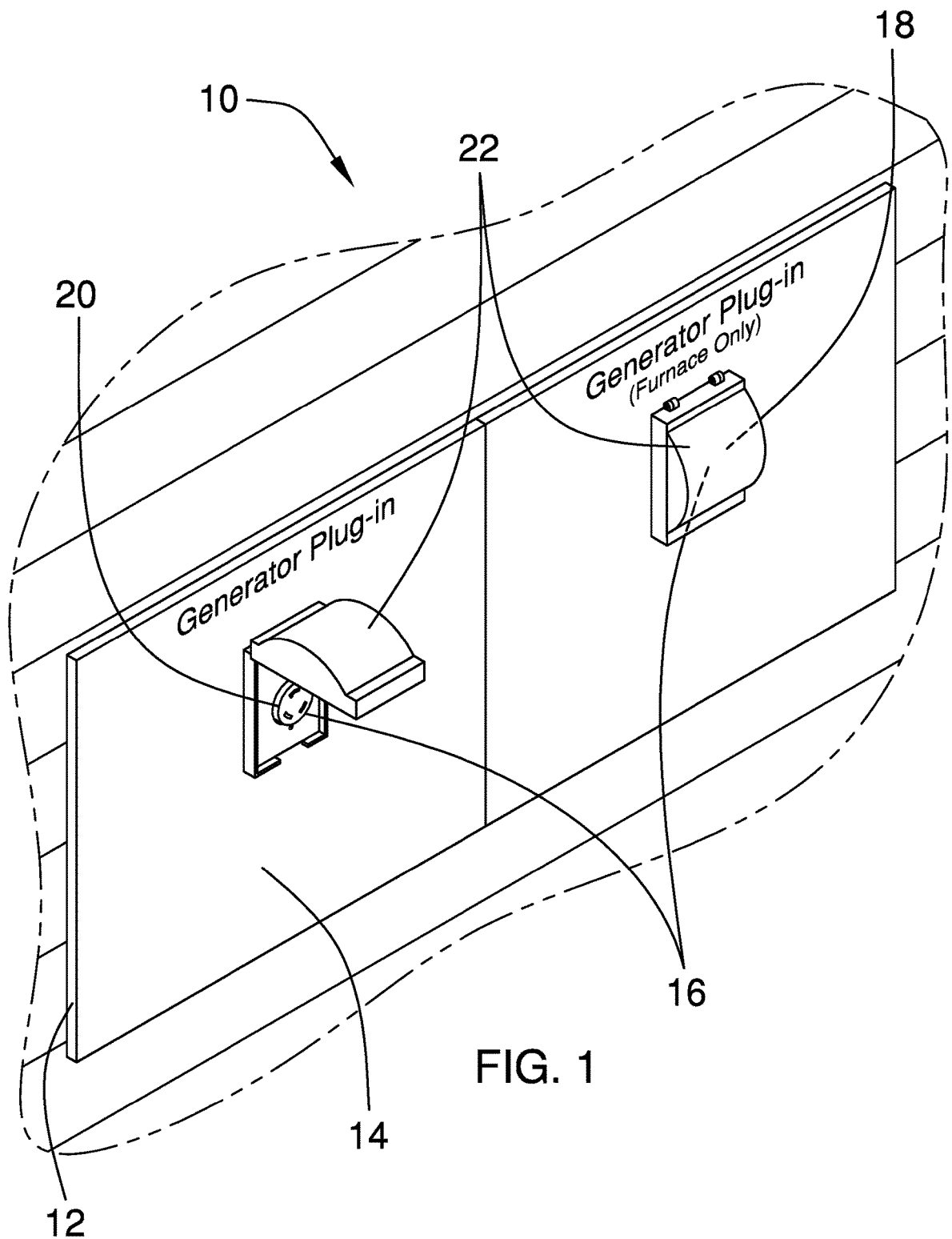
FIG. 1 is an isometric perspective view of a backup power distribution assembly according to an embodiment of the disclosure.
Figure 2:
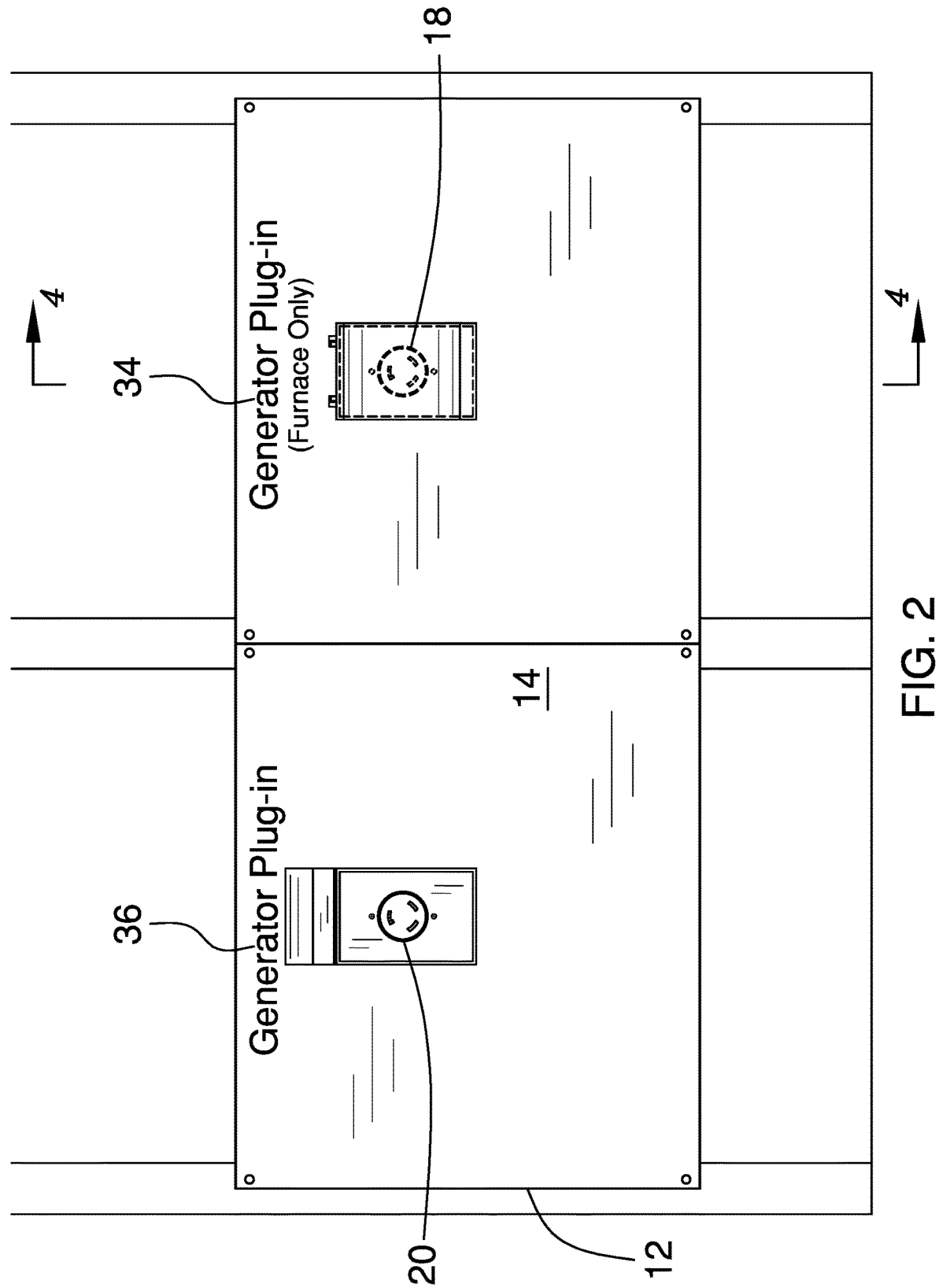
FIG. 2 is an exterior view of an embodiment of the disclosure.
Figure 3:
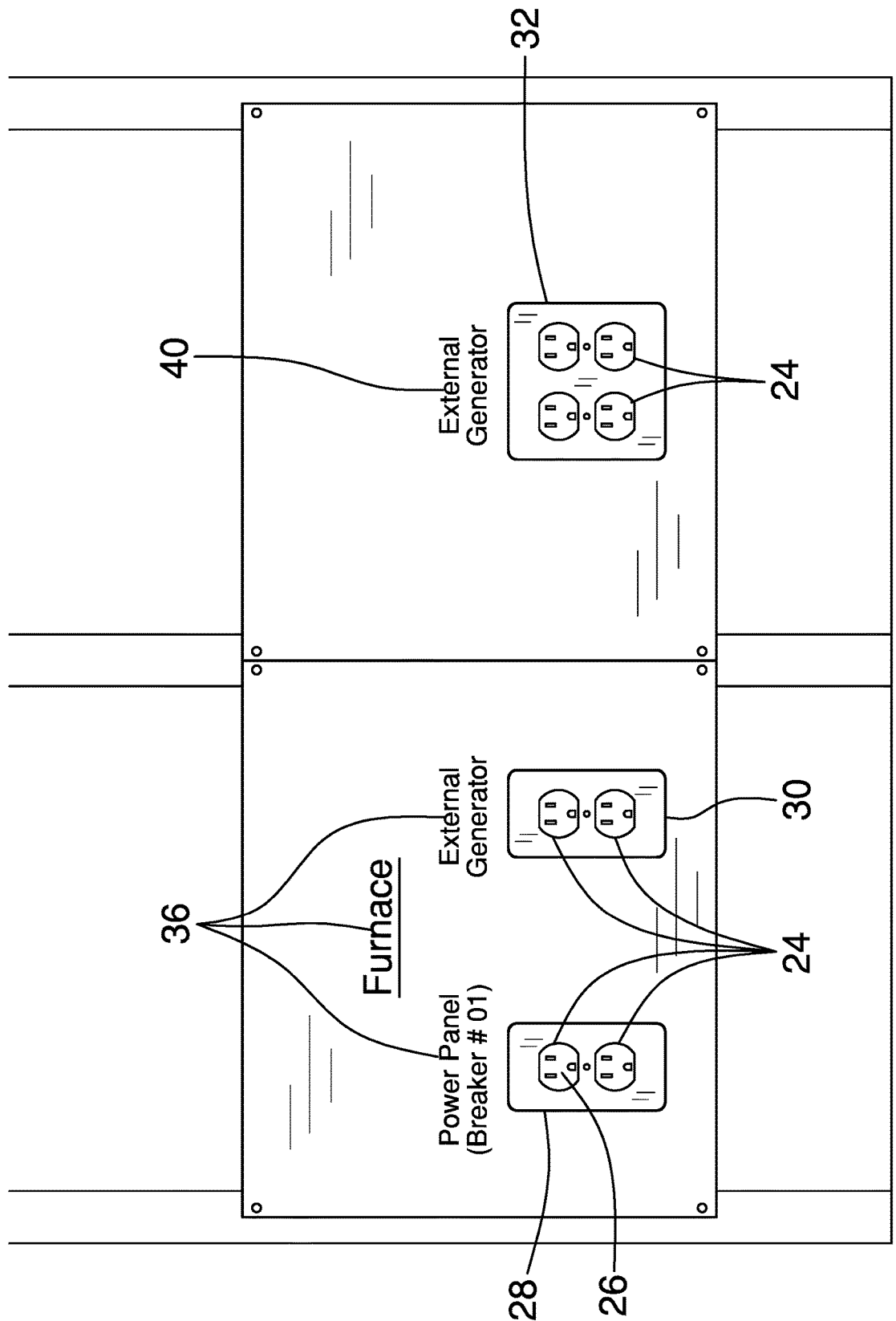
FIG. 3 is an interior view of an embodiment of the disclosure.
Figure 4:
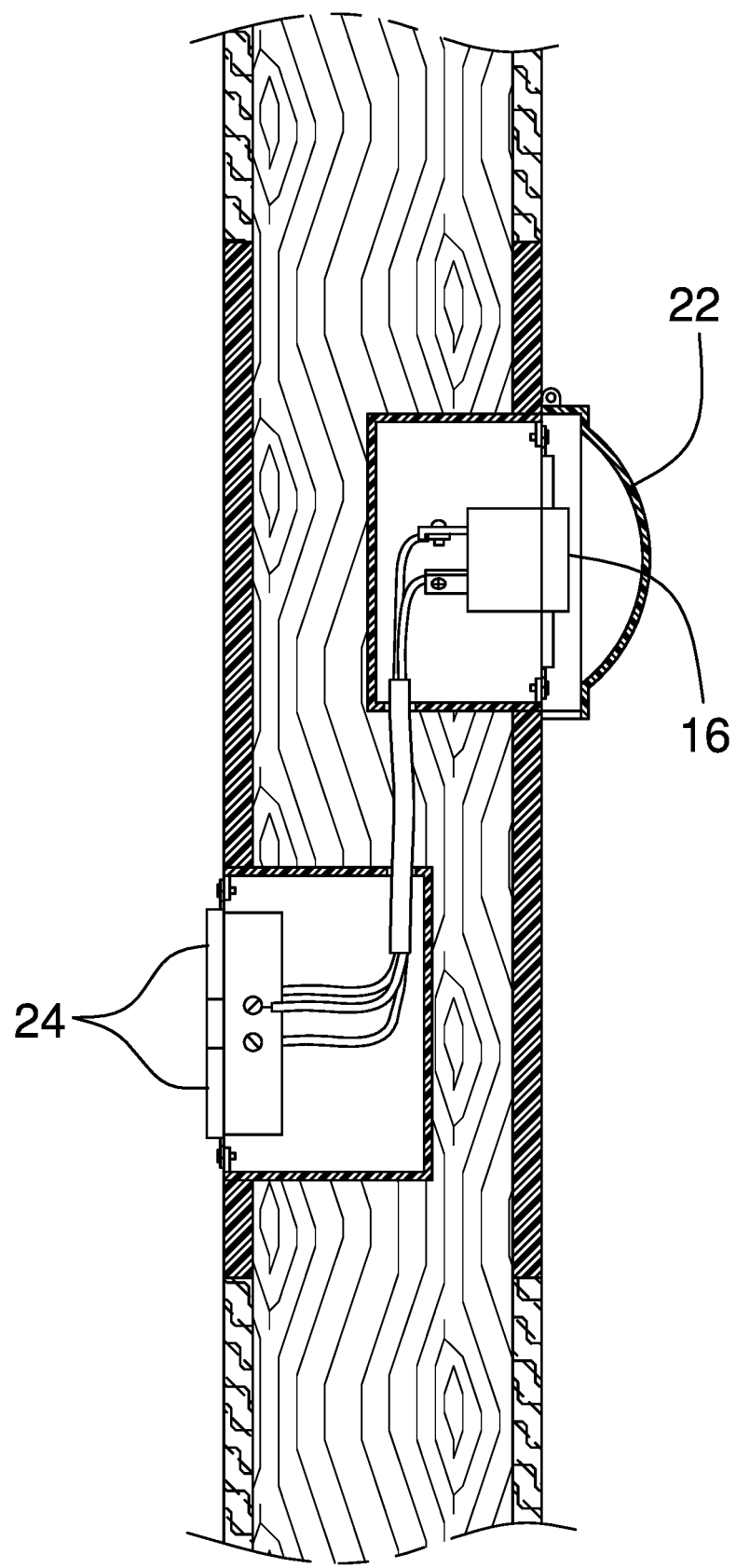
FIG. 4 is a cross-sectional view of an embodiment of the disclosure.

With reference now to the drawings, and in particular to FIGS. 1 through 4 thereof, a new distribution assembly embodying the principles and concepts of an embodiment of the disclosure and generally designated by the reference numeral 10 will be described.

As best illustrated in FIGS. 1 through 4, the backup power distribution assembly 10 generally comprises a junction box 12 that is configured to couple to an exterior surface of a structure, such as a house. In one embodiment, the junction box 12 is configured to position in a wall of the structure such that a front 14 of the junction box 12 is substantially coplanar with the exterior surface.

A plurality of ports 16 is coupled to and is positioned in the junction box 12. Each of the plurality of ports 16 is configured to selectively couple to a backup generator.

In one embodiment, the plurality of ports 16 comprises a first socket 18 and a second socket 20.

Each of a plurality of lids 22 is hingedly coupled to the junction box 12 proximate to a respective port 16. Each lid 22 is positioned to selectively and sealably cover the respective port 16.

A plurality of outlets 24 is configured to couple to an interior surface of the structure. Each of the plurality of outlets 24 is operationally coupled to a respective port 16. Each outlet 24 is configured to couple selectively and operationally to a respective appliance, such as a refrigerator, a furnace, a television, and a light. The respective appliance is selectively couplable to a respective generator to power the respective appliance in event of a power outage.

In one embodiment, the plurality of outlets 24 is configured to position in the wall of the structure such that a front face 26 of each outlet 24 is substantially coplanar with the interior surface.

In another embodiment, the plurality of outlets 24 comprises a first receptacle 28 and a second receptacle 30. The first receptacle 28 comprises two outlets 24 and is operationally coupled to the first socket 18. A respective outlet 24 of the first receptacle 28 is configured to operationally couple to the furnace of the structure. The furnace is selectively couplable to the respective generator to power the furnace in the event of the power outage. The second receptacle 30 comprises two outlets 24 and is operationally coupled to the first socket 18. Each outlet 24 of the second receptacle 30 is configured to operationally couple to the respective appliance, such as the television and the light. The television and the light are selectively couplable to the respective generator to power the television and the light in the event of the power outage.

In yet another embodiment, the plurality of outlets 24 comprises a third receptacle 32. The third receptacle 32 comprises four outlets 24 and is operationally coupled to the second socket 20. Each outlet 24 of the second receptacle 30 is configured to operationally couple to the respective appliance, such as the refrigerator, the television, and the light. The refrigerator, the television, and the light are selectively couplable to the respective generator to power the refrigerator, the television, and the light in the event of the power outage.

First indicia 34 are coupled to the junction box 12 proximate to the first socket 18. The first indicia 34 are configured to indicate that the first socket 18 is coupled to the first receptacle 28 and the second receptacle 30.

Second indicia 36 are coupled to the junction box 12 proximate to the second socket 20. The second indicia 36 are configured to indicate that the second socket 20 is coupled to the third receptacle 32.

Third indicia 38 are coupled to the interior surface proximate to the first receptacle 28 and the second receptacle 30. The third indicia 38 are configured to indicate that the first receptacle 28 and the second receptacle 30 are coupled to the first socket 18.

Fourth indicia 40 are coupled to the interior surface proximate to the third receptacle 32. The fourth indicia 40 are configured to indicate that the third receptacle 32 is coupled to the second socket 20.

In use, the respective outlet 24 of the first receptacle 28 is configured to operationally couple to the furnace of the structure. The furnace is selectively couplable to the respective generator to power the furnace in the event of the power outage. Each outlet 24 of the second receptacle 30 is configured to operationally couple to the respective appliance, such as the television and the light. The television and the light are selectively couplable to the respective generator to power the television and the light in the event of the power outage. Each outlet 24 of the second receptacle 30 is configured to operationally couple to the respective appliance, such as the refrigerator, the television, and the light. The refrigerator, the television, and the light are selectively couplable to the respective generator to power the refrigerator, the television, and the light in the event of the power outage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A backup power distribution assembly comprising:
   a junction box configured for coupling to an exterior surface of a structure;
   a plurality of ports coupled to and positioned in said junction box, each of said plurality of ports being configured for selectively coupling to a backup generator, said plurality of ports comprising a first socket and a second socket;
   a plurality of outlets configured for coupling to an interior surface of the structure, each of said plurality of outlets being operationally coupled to a respective said port, each said outlet being configured for selectively operationally coupling to a respective appliance such that the respective appliance is selectively coupled to the respective generator for powering the respective appliance in event of a power outage, said plurality of outlets comprising
      a first receptacle comprising two said outlets, said first receptacle being operationally coupled to said first socket,
      a second receptacle comprising two said outlets, said second receptacle being operationally coupled to said first socket, and
      wherein said first receptacle is positioned on the interior surface of the structure such that a respective said outlet of said first receptacle is configured for operationally coupling to the furnace of the structure, such that the furnace is selectively couplable to the respective generator for powering the furnace in the event of the power outage, wherein said second receptacle is positioned on the interior surface of the structure such that each said outlet of said second receptacle is configured for operationally coupling to the respective appliance such that the television and the light are selectively couplable to the respective generator for powering the television and the light in the event of the power outage; and
   wherein said plurality of ports are positioned in said junction box such that each said port is configured for coupling to the backup generator, wherein said plurality of outlets is positioned on the interior surface such that each said outlet is configured for operationally coupling to the respective appliance such that the respective appliance is selectively coupled to the respective generator for powering the respective appliance in the event of the power outage.

2. The assembly of claim 1, further including said junction box being configured for positioning in a wall of the structure such that a front of the junction box is substantially coplanar with the exterior surface.

3. The assembly of claim 1, further including a plurality of lids, each said lid being hingedly coupled to said junction box proximate to a respective said port, wherein said plurality of lids is positioned on said junction box such that each said lid is positioned for selectively sealably covering said respective said port.

4. The assembly of claim 1, further including said plurality of outlets being configured for positioning in the wall of the structure such that a front face of each said outlet is substantially coplanar with the interior surface.

5. The assembly of claim 1, further including said plurality of outlets comprising a third receptacle comprising four said outlets, said third receptacle being operationally coupled to said second socket, wherein said second receptacle is positioned on the interior surface of the structure such that each said outlet of said second receptacle is configured for operationally coupling to the respective appliance such that the refrigerator, the television, and the light are selectively couplable to the respective generator for powering the refrigerator, the television, and the light in the event of the power outage.

6. The assembly of claim 5, further comprising:
first indicia coupled to said junction box proximate to said first socket, said first indicia being configured for indicating said first socket being coupled to said first receptacle and said second receptacle;
second indicia coupled to said junction box proximate to said second socket, said second indicia being configured for indicating said second socket being coupled to said third receptacle;
third indicia coupled to the interior surface proximate to said first receptacle and said second receptacle, said third indicia being configured for indicating said first receptacle and said second receptacle being coupled to said first socket; and
fourth indicia coupled to the interior surface proximate to said third receptacle, said fourth indicia being configured for indicating said third receptacle being coupled to said second socket.

7. A backup power distribution assembly comprising:
a junction box configured for coupling to an exterior surface of a structure, said junction box being configured for positioning in a wall of the structure such that a front of the junction box is substantially coplanar with the exterior surface;
a plurality of ports coupled to and positioned in said junction box, each of said plurality of ports being configured for selectively coupling to a backup generator, wherein said plurality of ports are positioned in said junction box such that each said port is configured for coupling to the backup generator, said plurality of ports comprising a first socket and a second socket;
a plurality of lids, each said lid being hingedly coupled to said junction box proximate to a respective said port, wherein said plurality of lids is positioned on said junction box such that each said lid is positioned for selectively sealably covering said respective said port;
a plurality of outlets configured for coupling to an interior surface of the structure, each of said plurality of outlets being operationally coupled to a respective said port, each said outlet being configured for selectively operationally coupling to a respective appliance such that the respective appliance is selectively couplable to a respective generator for powering the respective appliance in event of a power outage, wherein said plurality of outlets is positioned on the interior surface such that each said outlet is configured for operationally coupling to the respective appliance such that the respective appliance is selectively coupled to the respective generator for powering the respective appliance in event of a power outage, said plurality of outlets being configured for positioning in the wall of the structure such that a front face of each said outlet is substantially coplanar with the interior surface, said plurality of outlets comprising:
a first receptacle comprising two said outlets, said first receptacle being operationally coupled to said first socket, wherein said first receptacle is positioned on the interior surface of the structure such that a respective said outlet of said first receptacle is configured for operationally coupling to the furnace of the structure, such that the furnace is selectively couplable to the respective generator for powering the furnace in the event of the power outage,
a second receptacle comprising two said outlets, said second receptacle being operationally coupled to said first socket, wherein said second receptacle is positioned on the interior surface of the structure such that each said outlet of said second receptacle is configured for operationally coupling to the respective appliance such that the television and the light are selectively couplable to the respective generator for powering the television and the light in the event of the power outage, and
a third receptacle comprising four said outlets, said third receptacle being operationally coupled to said second socket, wherein said second receptacle is positioned on the interior surface of the structure such that each said outlet of said second receptacle is configured for operationally coupling to the respective appliance such that the refrigerator, the television, and the light are selectively couplable to the respective generator for powering the refrigerator, the television, and the light in the event of the power outage;
first indicia coupled to said junction box proximate to said first socket, said first indicia being configured for indicating said first socket being coupled to said first receptacle and said second receptacle;
second indicia coupled to said junction box proximate to said second socket, said second indicia being configured for indicating said second socket being coupled to said third receptacle;
third indicia coupled to the interior surface proximate to said first receptacle and said second receptacle, said third indicia being configured for indicating said first receptacle and said second receptacle being coupled to said first socket;
fourth indicia coupled to the interior surface proximate to said third receptacle, said fourth indicia being configured for indicating said third receptacle being coupled to said second socket; and
wherein said first receptacle is positioned on the interior surface of the structure such that a respective said outlet of said first receptacle is configured for operationally coupling to the furnace of the structure, such that the furnace is selectively couplable to the respective generator for powering the furnace in the event of the power outage, wherein said second receptacle is positioned on the interior surface of the structure such that each said outlet of said second receptacle is configured for operationally coupling to the respective appliance such that the television and the light are selectively couplable to the respective generator for powering the television and the light in the event of the power outage, wherein said second receptacle is positioned on the interior surface of the structure such that each said outlet of said second receptacle is configured for operationally coupling to the respective appliance such that the refrigerator, the television, and the light are selectively couplable to the respective generator for powering the refrigerator, the television, and the light in the event of the power outage.

* * * * *